United States Patent [19]

Swift

[11] 4,040,741
[45] Aug. 9, 1977

[54] POLARIZED GRATING OPTICAL ODOMETER

[75] Inventor: David William Swift, Prestatyn, Wales

[73] Assignee: Perkin-Elmer Limited, Bucks, England

[21] Appl. No.: 697,489

[22] Filed: June 18, 1976

Related U.S. Application Data

[63] Continuation of Ser. No. 441,469, Feb. 11, 1974.

[30] Foreign Application Priority Data

Feb. 14, 1973 United Kingdom .................. 7125/73

[51] Int. Cl.² .............................................. G01P 3/36
[52] U.S. Cl. ..................................... 356/28; 250/226
[58] Field of Search ............. 356/28, 169; 350/162 R; 250/237 G, 226

[56] References Cited

U.S. PATENT DOCUMENTS

| | | | |
|---|---|---|---|
| 3,533,702 | 10/1970 | Hock et al. ........................ | 356/169 |
| 3,781,110 | 12/1973 | Leitz et al. ............................ | 356/4 |

FOREIGN PATENT DOCUMENTS

| | | | |
|---|---|---|---|
| 1,249,302 | 10/1971 | United Kingdom .................. | 356/28 |

Primary Examiner—S.C. Buczinski
Attorney, Agent, or Firm—S. A. Giarratana; F. L. Masselle

[57] ABSTRACT

An optical system for measuring relative lateral displacement or velocity relative to a surface above which the system is independently supported has a grating consisting of different bands that are adapted to impart to incident light received from the surface two different optically selective characteristics such as different polarizations or different wavelengths. Light transmitted by or reflected from the bands is focussed through filtering means onto photodetectors which produce signals proportional to the light received thereby. The filtering means (polarization selective or wavelength selective, as the case may be) associated with the respective photodetectors respectively separate light coming from bands having one of said characteristics from light from the bands having the other of said characteristics. The signals from the photodetectors are applied to a differential amplifier which produces an output signal representing the difference between the photodetector signals and which thus has a frequency representing the speed or movement of the system relative to the surface. This output signal may then be applied to known frequency counting devices for indicating velocity or distance travelled from a zero position.

14 Claims, 4 Drawing Figures

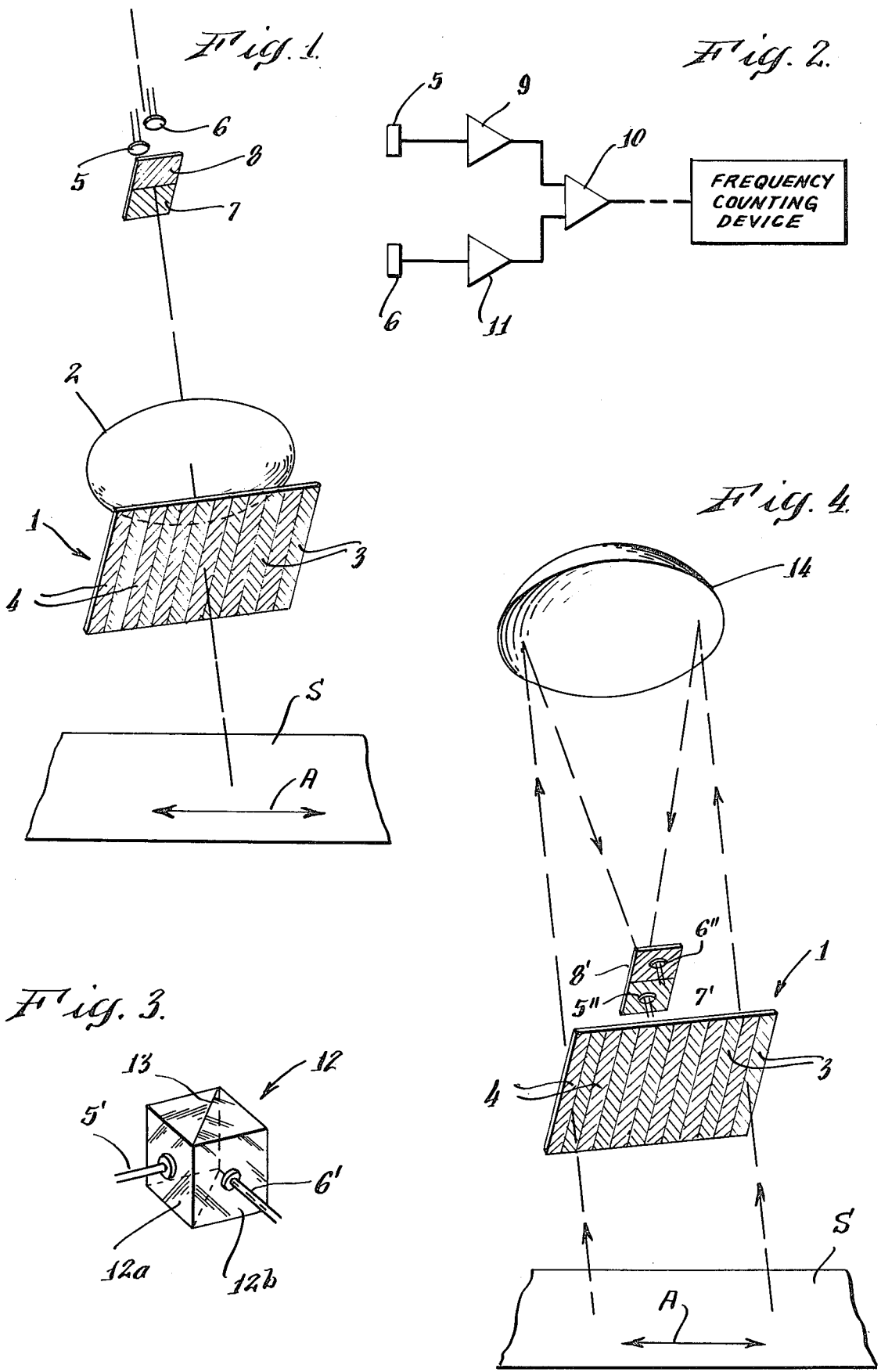

POLARIZED GRATING OPTICAL ODOMETER

This is a continuation, of application Ser. No. 441,469 filed Feb. 11, 1974.

BACKGROUND OF THE INVENTION

Applicant claims priority under 35 U.S.C. 119 for Application No. 7125/73 filed Feb. 14, 1973 in the Patent Office of Great Britain This invention concerns improvements in or relating to optical systems for measuring relative displacement or velocity and more particularly optical systems suitable for use as odometers or speedometers.

Background prior art is found in the following patents:

U.S. Pat. Nos., 2,016,036, 2,413,349, 3,336,480, 3,511,569, 3,677,647.
United Kingdom Patent Nos., 1,118,879, 1,123,950, 1,144,488,
French Patent No. 2,143,950.

BRIEF SUMMARY OF THE INVENTION

According to the present invention there is provided apparatus for measuring displacement or velocity relative to a surface, e.g. the ground above which the apparatus is independently supported as in a vehicle moving over the ground, for example. The apparatus comprises generally grating means with bands having two different optically selective characteristics arranged in alternation which render light from the surface which was incident on the bands having one characteristic optically distinguishable from that which was incident on the bands having the other characteristic, optically selective filter means arranged to separate light coming from the bands having said one characteristic from light coming from the bands having said other characteristic, thereby to provide from the light from the respective bands separate light signals representative of luminous intensity variations of the surface relative to which the grating means travels, and means effective to compare said separate light signals and to produce an output signal derived from the difference therebetween. This output signal is representative of the lateral displacement of the apparatus relative to the surface.

Conveniently the grating means comprises a first series of spaced parallel bands having said one characteristic and a second series of spaced parallel bands interposed between the bands of the first series in alternation therewith and having said other characteristic, the system being arranged so that light from the surface transmitted through (or reflected from) the bands of said second series, and the optically selective filter means being located to receive light from the surface transmitted through (or reflected from) the grating means.

Preferably light from the surface is transmitted through the bands of the grating means to the optically selective filter means.

The apparatus preferably comprises first and second photodetector means the optically selective filter means being associated with the photodetector means so that one photodetector means detects light from the bands having said one characteristic while the other photodetector means detects light from the bands having said other characteristic, the system preferably including focussing or light collecting means to focus or collect light from the grating means on to the photodetector means.

In one embodiment in accordance with the invention the focussing or light collecting means comprises an objective lens positioned adjacent the grating means and adapted to focues or collect light transmitted through the grating means on to the photodetector means at a position spaced from the grating means. In this embodiment the photodetector means are placed in the focal plane of the objective lens giving a telecentric arrangement. The grating means is placed adjacent to or in front of the objective lens for convenience although this is not absolutely necessary. In an alternative embodiment the grating means may be placed in the plane where the objective lens forms an image of the surface. In this case an extra light collecting means of known type may be provided follwoing the grating means to collect the light on to the photodetector means. The system may be telecentric if the system stop, which may be conjugate with the photodetector means, is in the focal plane of the objective lens.

In another embodiment in accordance with the invention the focussing or light collecting means comprises a mirror at a position spaced from the grating means and arranged to reflect light transmitted through the grating means on to the photodetector means, and in this embodiment the photodetector means may be positioned adjacent or in the plane of the grating means.

The optically selective filter means associated with the photodetector means may comprise separate optically selective filters associated with said first and second photodetector means. Alternatively the filter means may comprise an optically selective beam splitter arranged to transmit light from the bands having said one characteristic to said first photodetector means and to reflect light from the bands having said other characteristic to said second photodetector means.

The photodetector means are preferably adapted to emit electrical signals representative of the received light signals, the system them comprising means to compare the respective electrical signals and to produce an electrical output signal.

Conveniently said optically selective characteristcs may be polarization characteristics so that light coming from the bands having said one characteristic is distinguishable by its polarization from light coming from the bands having said other characteristic, the optically selective filter means then being polarization selective. More particularly, the bands having said one characteristic may be adapted to transmit light polarized in one plane while the bands having said other characteristic are adapted to transmit light polarized in the orthogonal plane. In this case the optically selective filter means may comprise separate polarization selective filters respectively adapted to transmit light polarized in said one plane and to transmit light polarized in said orthogonal plane, or may comprise a polarization selective beam splitter adapted to transmit light polarized in said one plane and to reflect light polarized in said orthogonal plane. However, if desired, circular polarization may be employed in place of plane polarization.

Alternatively said optically selective characteristics may be spectral characteristics so that light coming from the bands having said one characteristic is distinguishable by its wavelength from light coming from the bands having said other characteristic, the optically selective filter means then being wavelength selective.

In this case the bands preferably have mutually exclusive spectral transmission (or reflection) characteristics.

Embodiments of optical systems employing apparatus in accordance with the invention will now be described, by way of example, with reference to the accompanying drawings in which:

DESCRIPTION OF THE DRAWINGS

FIG. 1 is a schematic representation of one embodiment of optical system in accordance with the invention, FIG. 2 is a schematic circuit diagram of electrical equipment for use with the optical system of FIG. 1, FIG. 3 is a schematic perspective view of alternative optical filter means for use in the system of FIG. 1, and FIG. 4 is a schematic representation of another embodiment of optical system in accordance with the invention.

DETAILED DESCRIPTION OF THE INVENTION

FIG. 1 shows an optical system which is arranged to traverse relative to a surface S (or relative to which the surface travels) in a direction indicated by the arrow A. For example, the system may be mounted on a vehicle so that it travels over the ground (e.g. to provide an odometer or a speedometer), and is described below in that mode.

The system comprises a polarized grating arrangement generally indicated as 1 which is positioned in front of an objective lens 2. The grating arrangement comprises a series of parallel bands with alternate bands being polarized in one direction, the other bands being polarized in the orthogonal direction. thus the bands 3 transmit light plane polarized in one direction and the bands 4, which are interposed between the bands 3, transmit light plane polarized in the orthogonal direction.

Beyond the objective lens 2 are two photodetectors in the form of photodiodes 5 and 6. A polarization selective filter in positioned in front of each photodiode, a filter 7 in front of the photodiode 5 being so polarized as to permit light polarized in the plane transmitted by the bands 3 to pass through the filter to the photodiode but so as to block light polarized in the orthogonal plane, i.e., light transmitted by the bands 4. A filter 8 in front of the photodiode 6 is effectively polarized in the orthogonal direction to the filter 7, i.e., is so polarized as to permit light polarized in the plane transmitted by the bands 4 to pass therethrough but to block light polarized in the orthogonal plane, i.e., light transmitted by the bands 3. It will thus be appreciated that light transmitted by the bands 3 is detected by the photodiode 5 while light transmitted by the bands 4 is detected by the photodiode 6, the light being focussed on to the photodiodes by the objective lens 2.

The surfaces relative to which the optical system travels, i.e., the ground, has under virtually all practical circumstances a non-uniform luminous intensity. Thus as the system travels relative to the ground the light signals received, and hence the electrical signals emitted, by the photodiodes 5 and 6 will be representative of variations in the luminous intensity of the ground. These signals will include a component of frequency indicative of speed of movement.

If the system travels relative to the ground at velocity "$v$", then each bright point of the ground effectively moves across the grating 1 with a velocity $vm$ where $m$ is the optical magnification (which is in the described embodiment unity) between the ground and the grating. If the spatial frequency of the grating is $g$ cycles/unit length, this will result in a signal of frequency $f = vmg$ cycles/unit time from each of the photodiodes 5 and 6. This, the distance travelled from a given time zero is $$\int_0^t v\,dt = \int_0^t \frac{1}{mg} f\,dt.$$

If $m$ and $g$ are constant, then this equals $1/mg \times$ total number of cycles since time zero. Thus, by counting the number of cycles of the signal, the displacement of the system relative to the ground can be measured.

The signals from the photodiodes 5 and 6 will in practice generally include, together with the frequency component indicative of displacement as explained above, a lower frequency component due to large scale luminous intensity variations of the ground. However, the higher frequency component carried by the signals from the photodiodes 5 and 6 will be in out of phase relationship due to the grating arrangement 1 whereby the photodiode 5 receives light signals from the spaced bands 3 whilst the photodiode 6 receives light signals from the spaced bands 4 (the direction of travel being perpendicular to the bands.) In other words, there will effectively be a half-wave phase shift between the respective signals from the photodiodes 5 and 6. Thus, by appropriate comparison of the electrical signals emitted from the photodiodes 5 and 6, the unwanted lower frequency component can effectively be eliminated (although some modulation may remain) and the higher frequency component retained. Such comparison of the signals can be achieved by means of electrical devices arranged as schematically shown in FIG. 2.

The electrical signal emitted by the photodiode 5 passes through an amplifier 9 to a differential amplifier 10. The electrical signal emitted by the photodiode 6 similarly passes through an amplifier 11 to the differential amplifier 10. The differential amplifier 10 emits an output signal representative of the difference between the signals from the amplifiers 9 and 11, this output signal thus having a frequency representative of the displacement of the grating arrangement 1 relative to the ground, the lower frequency component having been eliminated (except as a modulation). The output signal from the differential amplifier 10 can thus be used in any suitable manner as by applying the output signal from the amplifier 10 to a converting frequency counting device with an appropriate scaling factor to indicate the displacement of the grating arrangement relative to the ground, and for example to indicate the velocity of travel relative to the ground and/or to indicate the distance travelled from a given zero position.

As an alternative arrangement, the polarization selective filters 7 and 8, which are shown positioned in front of the photodiodes 5 and 6 in FIG. 1 may be replaced by a polarizing beam splitter 12 as shown in FIG. 3. The polarizing beam splitter 12, which is off known form, comprises a cube-like member having a polarizing diagonal interface 13 between the two prisms 12a and 12b which form the beam splitter 12. The interface 13 is arranged to transmit light polarized in one plane and to reflect light polarized in the orthogonal plane. One of the photodiodes 5' is positioned to receive light transmitted by the interface 13 while the other photodiode 6' is positioned to receive light reflected by the interface.

Thus the interface 13 can be arranged so that light transmitted through the grating bands 3 (i.e., polarized in one plane) is transmitted through the interface of the beam splitter to be received by the photodiode 5', and light transmitted through the grating bands 4 (i.e., polarized in the orthogonal plane) is reflected by the interface 13 of the beam splitter to be received by the photodiode 6'. The photodiodes 5' and 6' thus emit electrical signals representative of the light signals received as previously described.

In the embodiment described above with reference to FIG. 1 the photodiodes 5 and 6 are located in the focal plane of the objective lens 2 giving a telecentric arrangement. It is convenient to place the grating arrangement 1 adjacent to or in front of the objective lens 2 but this is not essential. The grating arrangement 1 may be placed in the plane where the objective lens 2 forms an image of the ground (or other surace S) and there may then be provided a further light collecting means, such as a lens, beyond the grating arrangement to collect the light on to the photodetector means. Such a system can be telecentric if the system stop, which may be conjugate with the photodetector means, is in the focal plane of the objective lens.

FIG. 4 shows an alternative embodiment to that shown in FIG. 1 but which operates on essentially the same principle. In the FIG. 4 embodiment, however, the objective lens is effectively replaced by a concave spherical mirror 14 positioned at a distance from the grating arrangement 1 such that light reflected from the mirror 14 is focussed or collected essentially in the plane of the grating arrangement. Photodiodes 5" and 6" with their associated polarization selective filters 7' and 8' are located in the plane of the grating arrangement 1.

As previously described with reference to FIG. 1, light polarized in one plane is transmitted by the polarizing bands 3 of the grating while light polarized in the orthogonal plane is transmitted by the polarizing bands 4. The transmitted light travels to the mirror 14 from which it is reflected and focussed at the region of the photodiodes 5" and 6" which emit electrical signals representative of the received light signals as previously described.

It will be appreciated that the embodiments described above as operating by plane polarization of the light could alternatively operate by circular polarization by use of appropriate grating bands 3 and 4 and filters 7 and 8 (or beam splitter interface 13). As a further alternative the embodiments described above could operate on the basis of spectral characteristics, the bands 3 being arranged to transmit light of a different (and preferably mutually exclusive) wavelength from that transmitted by the bands 4, the filters 7 and 8 respectively then being arranged to transmit light of the respective wavelength transmitted by the bands 3 and 4 (or the beam splitter interface 13 being arranged to transmit light of the one wavelength and reflect light of the other wavelength).

It will further be appreciated that although the embodiments described above operate by detecting light transmitted through the grating means the present invention in not limited to such an arrangement and could be operated by detecting light from the surface reflected by the grating means.

It will be seen that a system in accordance with the invention can be incorporated in a self-continued unit which can readily be fitted to a vehicle such as, by way of example, a wheeled vehicle or a tracked vehicle or a hovercraft. It will further be seen that the system can be used to measure actual displacement, i.e. distance, or to measure velocity, i.e. displacement per unit time, and the invention is therefore particularly suitable for use as an odometer or a speedometer.

It will further be understood that a system in accordance with the invention can be used to measure displacement or speed of a moving surface, the system being stationary and the surface moving past the system. Further, of course, the system could be used to measure relative displacement or velocity where both the system and the surface are in fact in motion. Yet further it will be appreciated that two systems could be arranged effective in orthogonal directions to measure respective orthogonal velocity components.

What is claimed is:

1. Apparatus for measuring displacement of velocity relative to a surface characterized by non-uniform luminous intensity with respect to which said apparatus is independently supported at a distance, said apparatus comprising:

grating means, having bands of two different optically selected characteristics arrayed transversely of the path of displacement and in alternating sequence, for rendering light from said surface which is incident on the bands having one characteristic optically distinguishable from that incident on the bands of the other characteristic;

means including optically selective filter means for separating light from the bands having said one characteristic from the light coming from the bands of said other characteristic, thereby to provide from the light from the respective bands separate light signals representative of luminous intensity variations of such a surface; and means for comparing said separate light signals to produce an output signal derived from the difference therebetween.

2. Apparatus according to claim 1 wherein light from the surface is transmitted through the bands of the grating means to the optically selective filter means.

3. Apparatus according to claim 1 comprising first and second photodetector means with which the optically selective filter means is associated so that one photodetector means detects light from the bands having said one characteristic while the other photodetector means detects light from the bands having said other characteristic.

4. Apparatus according to claim 3 wherein the optically selective filter means comprises separate filters associated with the respective photodetector means.

5. Apparatus as claimed in claim 3, wherein the optically selective filter means comprises an optically selective beam splitter arranged to transmit light from the bands having said one characteristic to said first photodetector means and to reflect light from the bands having said other characteristic to said second photodetector means.

6. Apparatus as claimed in claim 3 wherein said means including optically selective filter means includes focussing or light collecting means to focus or collect light from the grating means onto the photodetector means.

7. Apparatus as claimed in claim 6 wherein the focussing or light collecting means comprises an objective lens.

8. Apparatus as claimed in claim 6 wherein the focussing or light collecting means comprises a mirror at a position spaced from the grating means and arranged to reflect light transmitted through the grating means on to the photodetector means.

9. Apparatus according to claim 8 wherein the photodetector means is positioned adjacent or in the plane of the grating means.

10. Apparatus as claimed in claim 3 wherein the photodetector means are adapted to emit electrical signals representative of the received light signals, and comprising means to compare the respective electrical signals and to produce an electrical output signal representative of the displacement of the grating means relative to said surface.

11. Apparatus as claimed in claim 1 wherein said optically selective characteristics are polarization characteristics so that light coming from the bands having said one characteristic is distinguishable by its polarization from light coming from the bands having said other characteristic, the optically selective filter means being polarization selective.

12. Apparatus as claimed in claim 1 wherein said optically selective characteristics are spectral characteristics so that light coming from the bands having said one characteristic is distinguishable by its wavelength from light coming from the bands having said other characteristic, the optically selective filter means being wavelength selective.

13. Apparatus as claimed in claim 1 wherein the light from said surface is transmitted through said grating means.

14. Apparatus as claimed in claim 1 wherein the bands in said grating means are in parallel relationship one with respect to the others.

* * * * *

UNITED STATES PATENT AND TRADEMARK OFFICE
CERTIFICATE OF CORRECTION

PATENT NO. : 4,040,741
DATED : August 9, 1977
INVENTOR(S) : David William Swift

It is certified that error appears in the above-identified patent and that said Letters Patent are hereby corrected as shown below:

On the front page, please change the name of the assignee from "Perkin-Elmer Limited, Bucks, England" to --Pilkington P.E. Ltd. --.

Column 1, line 54, after "said", insert --first series is optically distinguishable from light from the surface transmitted through (or reflected from) the bands of said--.

Column 2, line 6, change "focues" to --focus--;

line 17, change "follwoing" to --following--;

line 41, change "them" to --then--.

Column 3, line 32, delete "with" and insert --3 and 4,--;

line 34, change "thus" to --Thus--;

line 41, change "in" to --is--.

Signed and Sealed this

Twentieth Day of December 1977

[SEAL]

Attest:

RUTH C. MASON
*Attesting Officer*

LUTRELLE F. PARKER
*Acting Commissioner of Patents and Trademarks*